United States Patent [19]
Blake et al.

[11] Patent Number: 5,294,184
[45] Date of Patent: Mar. 15, 1994

[54] OMNI LOCKING ADJUSTABLE SEAT BELT LOAD TRANSFER MECHANISM

[75] Inventors: Thomas B. Blake, Mt. Clemens; Reginald L. McDonald, Sterling Heights, both of Mich.

[73] Assignee: General Motors Corporation, Detroit, Mich.

[21] Appl. No.: 903,297

[22] Filed: Jun. 24, 1992

[51] Int. Cl.⁵ .................... A62B 35/00; A47C 31/00
[52] U.S. Cl. ................ 297/473; 280/801 R; 296/68.1
[58] Field of Search ............... 297/473, 468; 280/801 R, 801 A, 806; 296/68.1; 248/429

[56] References Cited
U.S. PATENT DOCUMENTS

| | | | |
|---|---|---|---|
| 3,424,494 | 1/1969 | McIntyre et al. | 297/385 |
| 3,845,987 | 11/1974 | Bashford | 297/385 |
| 4,248,480 | 2/1981 | Koucky et al. | 297/473 |
| 4,260,178 | 4/1981 | Klüting et al. | 280/804 |
| 4,451,060 | 5/1984 | Sylven | 280/801 |
| 4,482,188 | 11/1984 | Tilly et al. | 297/473 |
| 4,537,446 | 8/1985 | Roney et al. | 297/464 |
| 4,669,782 | 6/1987 | Nishiyama et al. | 297/473 |
| 4,676,556 | 6/1987 | Yamanoi et al. | 297/473 |
| 4,720,072 | 1/1988 | Kitano et al. | 248/429 |
| 4,923,214 | 5/1990 | Siegrist et al. | 280/806 |

Primary Examiner—Alexander Grosz
Attorney, Agent, or Firm—Charles E. Leahy

[57] ABSTRACT

A vehicle seat is mounted on the vehicle floor by a seat adjusting mechanism permitting fore and aft adjusting movement of the seat. A grooved rod is mounted on the vehicle floor. A locking device connected to the seat belt buckle houses a jaw sleeve which surrounds and is normally freely slidable along the grooved rod during seat adjustment. The jaw sleeve is slotted at one end to form a plurality of tooth members having a ramped outer surface. A collar formed integral with the jaw sleeve is threaded to receive a bolt attach to the seat adjuster and provides the connection of the locking device with the seat adjuster. The collar is moveable within a recess in the housing of the locking device from the normal, unlocked position in which the tooth members clear the grooves of the rod to a locked position in which the housing acts on the ramped surface of the tooth members to deflect the tooth member into a rod groove to lock the locking device on the rod under the imposition of a substantial occupant restraint load on the locking device by the seat belt. The seat belt attachment bracket is pivotable about the locking device housing to allow variable positioning of the belt buckle assembly during seat adjustment.

5 Claims, 2 Drawing Sheets

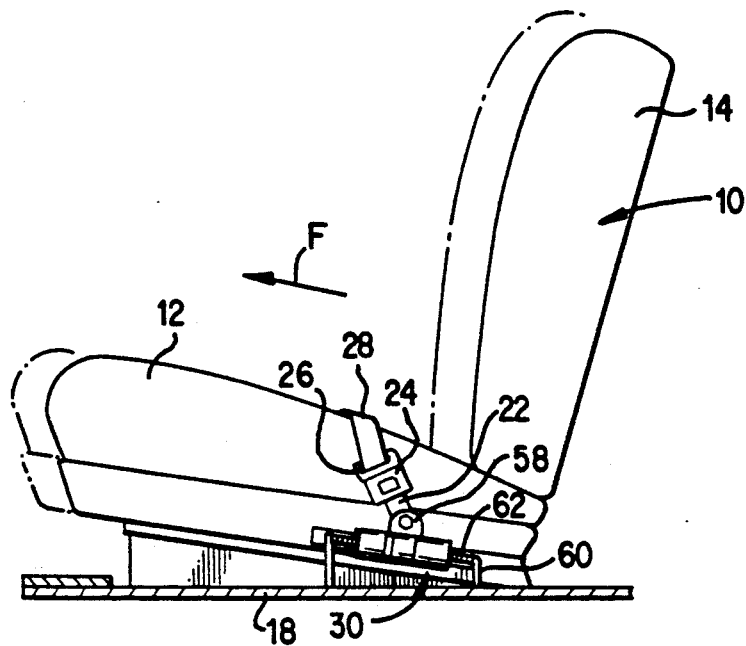
FIG. 1
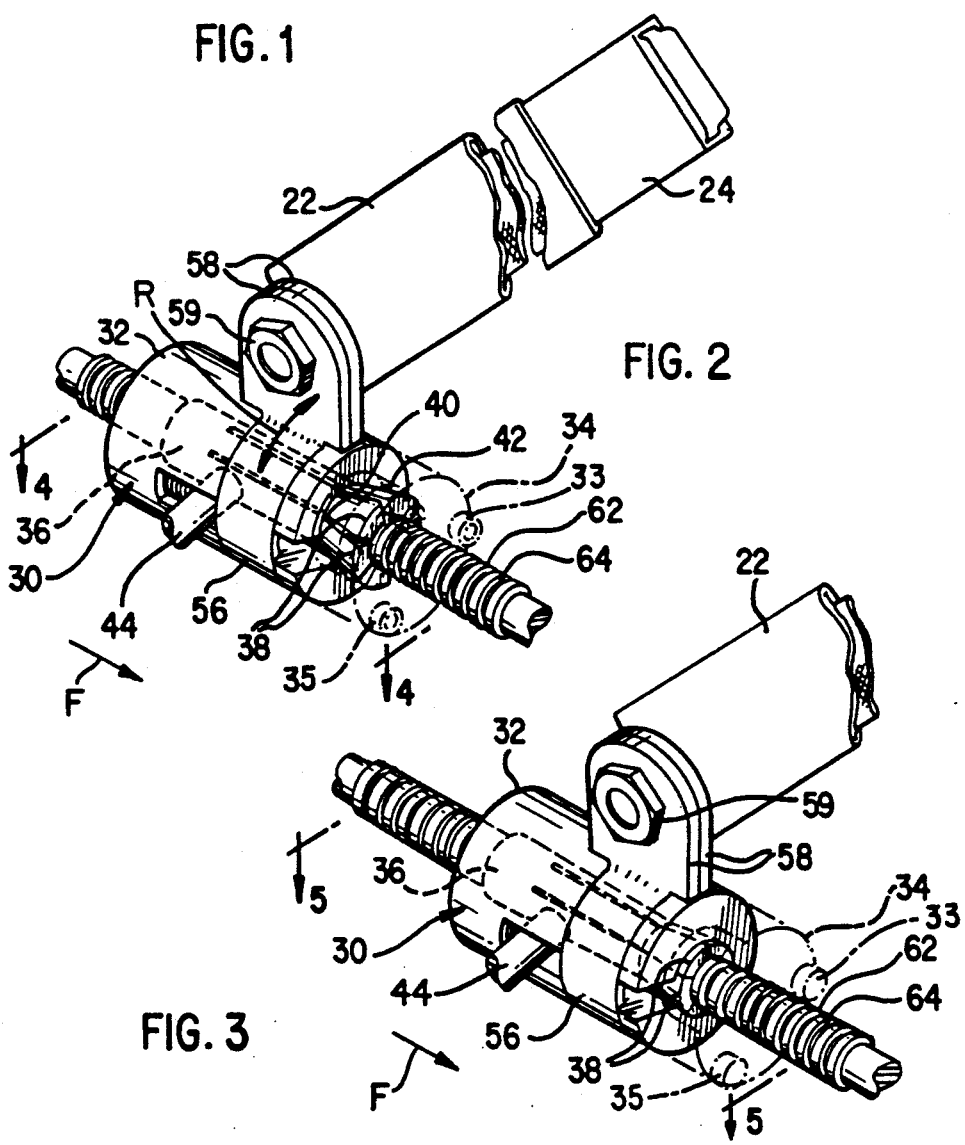
FIG. 2
FIG. 3

OMNI LOCKING ADJUSTABLE SEAT BELT LOAD TRANSFER MECHANISM

The invention relates to a seat belt anchorage system enabling the mounting of a restraint belt on a vehicle seat by transmitting the seat belt loads to the vehicle floor without imposing the belt load upon the seat adjusting mechanism and allowing free adjustment of the vehicle seat relative to the vehicle floor.

BACKGROUND OF THE INVENTION

It has been recognized in the prior art as desirable to mount a seat belt directly to the vehicle seat so that adjustment of the seat belt coincides with the adjusting movement of the seat. Various devices have been provided to act between the seat belt anchor on the seat and the vehicle floor to transfer occupant restraint loads to the floor.

Certain of these mechanisms include parts which are designed to deform upon imposition of a predetermined occupant restraint load to allow locking of a locking device. Examples of such parts are shear pins, bendable flanges or tabs, and crushable members which expose locking surfaces when severed. Some of these mechanisms require a considerable amount of seat belt travel before locking of the mechanism is achieved.

It would be desirable to provide a belt load anchorage mechanism which requires a minimal amount of belt travel in the occupant loading direction before lock-up occurs.

Accordingly, it is an object of the invention to provide such a belt load anchorage mechanism which requires a minimal amount of belt travel before lock-up, yet which allows free adjusting movement of the vehicle seat.

Another object of the invention is to provide a belt load anchorage mechanism which is repeatably functioning and does not include design features which incorporate sacrificial parts which must be discarded and replaced after the imposition of an occupant restraint load of a significant magnitude.

A further object of the invention is to provide a locking device for a belt load anchor mechanism which increases in its locking force as the magnitude of the imposing belt load is increased.

Yet another object of the invention is to provide a seat belt attachment which can pivot in multiple directions to better manage and direct the occupant restraint load along a desired path.

SUMMARY OF THE INVENTION

According to the invention, a vehicle seat is mounted on the vehicle floor by a seat adjusting mechanism permitting fore and aft adjusting movement of the seat. A slideable locking device is anchored to the seat adjuster and the seat belt attachment and normally travels freely along a floor mounted grooved rod. The locking device comprises a sliding collar and ramped jaw sleeve having tooth members. When an occupant restraint load is imposed on the seat belt attachment, the tooth members of the ramped jaw sleeve of the locking device are forced into engagement with the grooves of the floor mounted rod member to transmit the occupant restraint load from the seat to the floor.

BRIEF DESCRIPTION OF THE DRAWINGS

These and other features, objects and advantages of the invention will become apparent upon consideration of the specification and drawings in which:

FIG. 1 is a side elevation view of the vehicle seat employing the invention;

FIG. 2 is a perspective view of the locking mechanism in the unlocked condition, having one of the housing parts illustrated in phantom for ease in understanding the invention;

FIG. 3 is a perspective view of the locking mechanism in the locked condition, having one of the housing parts in phantom for ease in understanding the invention;

DESCRIPTION OF THE PREFERRED EMBODIMENT

Figure 4:
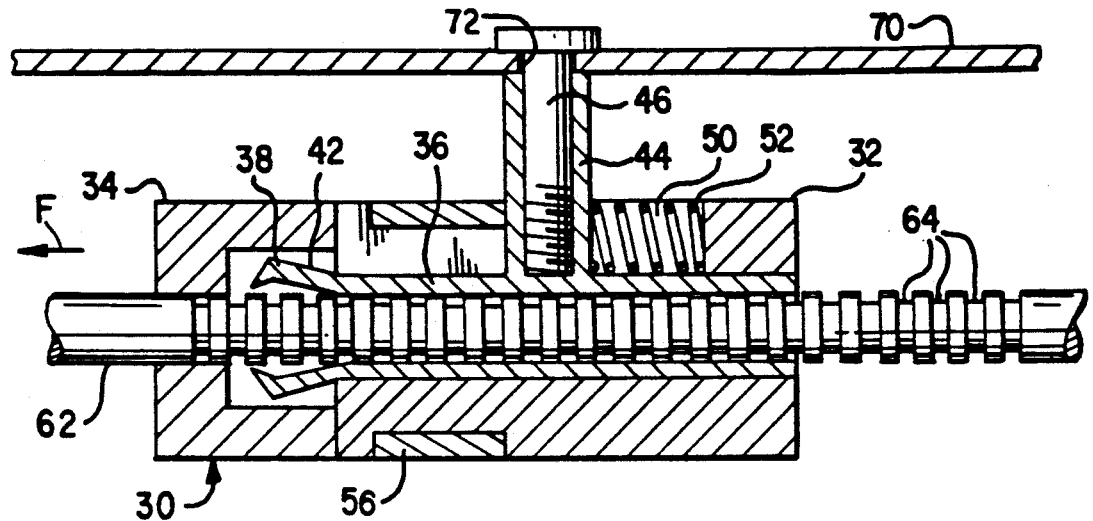
FIG. 4 is a sectional view taken in the direction of arrows 4—4 of FIG. 2.

Referring to FIG. 1, there is shown a vehicle seat generally indicated at 10 and including a seat bottom 12 and a seat back 14. The seat bottom has a frame which is conventionally mounted for adjusting movement relative to the vehicle floor 18 by a seat adjusting mechanism, described hereinafter. The seat adjusting mechanism may be of the type which moves the seat 10 fore and aft or may be a six-way seat adjuster which tilts the seat vertically as well as moves the seat fore and aft.

A seat belt attachment assembly 22 includes a buckle 24 for selective engagement by a latch plate 26 connected to an occupant restraint belt 28. The seat belt attachment assembly 22 and buckle 24 are mounted upon the seat for adjusting movement therewith by an anchorage mechanism to be described hereinafter.

Referring to FIG. 1, 2, and 3, there is illustrated a locking device 30 which is normally slideably mounted on the radially grooved (not threaded) rod 62 of a rod member 60, connected to the vehicle floor 18. Locking device 30 includes two housing halves 32, 34 connected together by bolts 33 and 35, which house a jaw sleeve 36 having a number of deflectable tooth members 38 formed by a plurality of slits 40 placed radially along one end of the sleeve 36. Referring to FIG. 4 in conjunction with FIG. 2, it is seen that, in the normal, unlocked condition of locking device 30, as illustrated in FIGS. 2 and 4, tooth members 38 are in close proximity but spaced away from the grooves 64 of rod 62. Jaw sleeve 36 is also formed so as to provide a ramped surface 42 on the outer surface of each tooth member 38.

Along the sleeve portion of jaw sleeve 36 and formed integrally therewith is a collar portion 44 which is internally threaded to receive a guide bolt 46 through a hole 72 in the guide bracket 70 integral to the seat adjuster so that the locking device 30 is connected to the seat 12 for forward and rearward adjusting movement therewith. The forward direction is indicated by the Arrow "F" in FIGS. 1 through 5.

Placed in a recess 50 within housing half 32 is a spring 52 used to urge the collar portion 44 of the jaw sleeve 36 against the forward most surface of the recess 50, as shown in FIG. 4.

Referring once more to FIGS. 2 and 3, a seat belt attachment bracket 56 surrounds the housing half 32 and is joined together at the top as further illustrated in FIG. 1 to provide two attachment flanges 58 for the seat belt buckle assembly 22. The seat belt attachment assembly 22 is secured with a conventional fastening means 59 and is able to rotate or pivot about the housing 32 in the direction of Arrow "R" of FIG. 2, to allow variable positioning of the belt buckle assembly.

OPERATION

Figure 5:
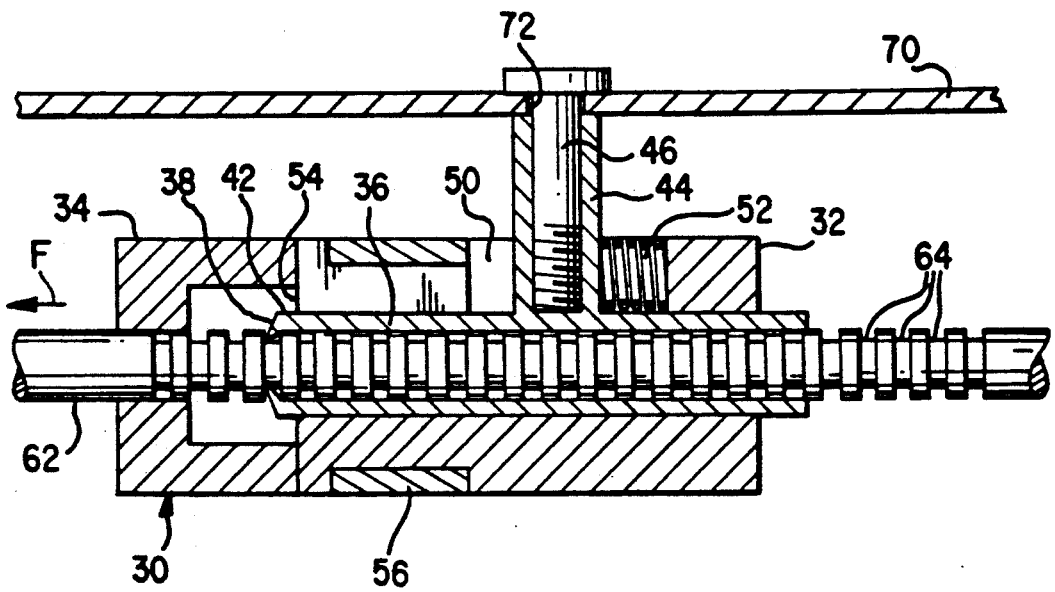
FIG. 5 is a sectional view taken in the direction of arrows 5—5 of FIG. 3.

In operation, with reference to FIG. 1 generally and FIGS. 3 and 5 particularly, when the vehicle seat is in the adjusted position, bolt 46 is restricted from free movement relative to vehicle floor 18 and floor mounted rod 62. In the event that a substantial occupant restraint load is imposed on seat belt attachment assembly 22 and consequently fastener 59, seat belt attachment bracket 56 and locking device 30 are urged forwardly in the direction of Arrow "F" and overcome the rearward bias of spring 52. When this occurs, housing halves 32, 34 are urged forward so that leading surface 54 of housing half 32 acts on ramped surfaces 42 of tooth members 38 to deflect tooth members 38 inwardly into a groove 64 of rod 62. This action causes locking device 30 to bind thus restricting further movement of seat belt buckle 24.

Referring now to FIG. 1 generally and FIGS. 2 and 4 particularly, during normal seat adjustment locking device 30 assumes the normal, un-locked position illustrated in FIGS. 2 and 4. In this position collar portion 44, carrying jaw sleeve 36 is urged against the forward most surface of housing recess 50, as seen in FIG. 4. In this position, tooth members 38 are free from the influence of leading surface 54 of housing half 32 and revert to the normal, outwardly extended position providing clearance of rod 62. Locking device 30 is thus able to move freely with respect to rod 62 for free adjustment of the vehicle seat.

Further during seat adjustment, seat belt attachment bracket 56 is freely pivotable about housing half 32 and thus locking device 30 to allow variable positioning of the belt buckle assembly.

The embodiments of the invention in which an exclusive property or privilege is claimed are defined as follows:

1. In combination with a longitudinally adjustable vehicle seat mounted on a vehicle floor, a seat belt anchorage comprising:

a member connected to the vehicle floor and having a rod extending along the path of longitudinal seat adjusting movement, the rod being provided with a plurality of annular grooves along the length of the rod;

a locking device having a housing containing a sleeve member encircling the rod, the sleeve member being normally longitudinally slideable relative to the rod and having a plurality of slits at one end thereof forming a plurality of tooth members having a ramped outer surface, so that movement of the housing relative to the sleeve moves the tooth members into locking engagement with the rod to thereby lock the locking device against longitudinal movement relative to the rod of the member connected to the vehicle floor;

means operatively connecting the seat belt with the locking device so that an occupant restraint load imposed upon the seat belt induces longitudinal movement of the housing relative to the ramped outer surfaces of the tooth members of the sleeve to move the tooth members into locking engagement with a groove of the rod whereby the seat belt is fixed relative to the member connected to the vehicle floor and the occupant restraint load is transmitted through the member to the vehicle floor; and means operatively connecting the seat belt adjustment mechanism with the sleeve of the locking device so that adjusting movement of the seat in either direction will move the sleeve and housing longitudinally relative to the rod with tooth members of the sleeve in a non-locking position to enable free longitudinal adjusting movement of the locking device and the seat belt during adjustment of the seat relative to the vehicle floor.

2. The apparatus of claim 1 wherein the rod is a round rod and the locking device is rotatable about the round rod to accommodate fitting of the seat belt to the vehicle occupant.

3. The apparatus of claim 1 wherein the means operatively connecting the seat belt adjustment mechanism with the sleeve of the locking device comprises an internally threaded extension of the jaw sleeve and a bolt threadedly engaging the extension and connected with the seat belt adjustment mechanism.

4. The apparatus of claim 3 wherein the housing of the locking device includes a recess through which the extension of the jaw sleeve passes and a spring received in recess biasing the jaw sleeve in the normal, unlocked position so that the tooth members clear the grooves of the rod.

5. The apparatus of claim 1 wherein the means operatively connecting the seat belt with the locking device comprises a bracket encircling the housing of the locking device and rotatable with respect to said housing, said bracket being fastened to the seat belt buckle assembly, allowing variable positioning of the seat belt buckle assembly.

* * * * *